Patented Nov. 8, 1932

1,886,868

UNITED STATES PATENT OFFICE

GEORGE B. BURNHAM, OF RENO, NEVADA, ASSIGNOR TO BURNHAM CHEMICAL COMPANY, OF WESTEND, CALIFORNIA, A CORPORATION OF NEVADA

PROCESS OF HEATING BRINE

No Drawing. Application filed October 4, 1927. Serial No. 224,030.

My invention relates to a process of heating brine and is particularly concerned with a process which is useful in obtaining sodium carbonate sulfate from Searles Lake brine. Searles Lake brine is a naturally occurring saline liquor containing sodium, potassium, carbonate, sulfate, chloride and borate ions. It is a very complex solution and requires special treatment to obtain the various contained salts. In the patent to Gauger and Storch, No. 1,689,526, there is disclosed a process of obtaining sodium carbonate sulfate which comprises heating Searles Lake brine by flowing it beneath a salt crust exposed to the sun's rays. This salt crust generally comprises sodium chloride as its principal ingredient and while the process disclosed in said application is admirable, there are certain advantages to be gained by employing the process of my invention. Brine undergoing solar heating beneath a salt crust readily absorbs the heat available when the sun's rays pass through the crust and enter the liquid. But since the atmosphere is in direct contact with the salt crust on the surface of the brine, considerable of the heat is lost by conduction and re-radiation from the crust. This loss may be negligible during the daytime, but if the brine is exposed beneath the crust during the night, as is often the case, the loss of heat becomes important.

It is therefore an object of my invention to reduce materially the loss of heat from brine undergoing heating.

Another object of my invention is to provide an efficient process of producing sodium carbonate sulfate.

My invention possesses other advantageous features, some of which with the foregoing, will be set forth at length in the following description where I shall outline in full the preferred form of the process of my invention.

The process of my invention preferably comprises exposing brine containing the salt to be obtained beneath a sheet of material which excludes the atmosphere from contact with the brine and which is separated from the brine by a layer for reducing the loss of heat.

While the process of my invention is by no means limited to heating brine to obtain the double salt of sodium carbonate sulfate and is likewise not limited to use with Searles Lake brine, it nevertheless is conveniently practised in that environment and I shall so describe it. The brine at Searles Lake is laden with sodium chloride and as a first step in obtaining sodium carbonate sulfate I preferably, although not necessarily, remove a portion of the sodium chloride. This is done in any suitable manner, as is well known in the art, and can be accomplished by exposing the brine in large ponds to the action of sun and wind so that sodium chloride crystallizes out by evaporation.

This exposure preferably transpires during the spring or summer to avoid crystallization of sodium sulfate which may occur on very cold winter nights. The summer evaporating temperature of the pond varies approximately from 25° C. to 35° C. The solubility of sodium carbonate sulfate in Searles Lake brine decreases above a temperature of 25° C. or 35° C. and this salt will crystallize out of brine saturated with it above 30° C.

The exposure of the brine is preferably continued until the liquor is approximately saturated with sodium carbonate sulfate. The brine is then pumped or flowed by gravity into a pond in which it is subject to solar action but is kept out of contact with the atmosphere. The brine in the pond is usually shallow, say from two to six inches in depth, and is covered to exclude the atmosphere.

The covering conveniently takes the form of a closed hothouse constructed over the pond and is largely composed of glass windows separated from the surface of the pond by an intervening layer of air. The windows can be relatively close to the brine but preferably are elevated sufficiently to permit workmen to enter the solar heater. In the latter case there are ventilators in the hothouse which normally are kept closed but can be opened for the comfort of the workmen.

When the brine, substantially saturated with sodium carbonate sulfate, is exposed to the action of the sun's rays within the solar heater its temperature rises and may attain 60° C. or over during the summer. This temperature is well in excess of the temperature of maximum solubility of sodium carbonate sulfate and that salt crystallizes out. Since the atmosphere is practically excluded from the pond, no material evaporation takes place and sodium chloride crystallization is negligible. The brine is permitted to remain in the solar heater until most of the available sodium carbonate sulfate has crystallized. This may occur in the course of a day or may require several days.

When the brine remains in the solar heater over night, very little of the heat absorbed during the day is lost. It appears that the radiant energy of the sun passes through the glass and through the intervening air to the brine in which it is absorbed as heat. The heat energy however, escapes with difficulty from the brine as the superposed layer of air acts as an effective insulator. The glass of the solar heater is therefore at all times comparatively cool as compared to the salt crust in the Gauger and Storch process and looses but little heat to the atmosphere. Other materials than glass can be used with beneficial results.

The brine is thus kept at an elevated temperature out of contact with the atmosphere until practically all of the saturated or supersaturated sodium carbonate sulfate has had an opportunity to crystallize. It is then removed from the solar heater and freshly concentrated brine is introduced. If desired, the flow of brine into and out of the heater can be continuous but in any event is preferably arranged so that crystals are deposited during the summer and are removed by workmen during the winter. The process of heating can be continued during the winter but at Searles Lake this usually entails a supply of artificial heat in the solar heater.

While I preferably subject the brine to a preliminary evaporation to reduce its sodium chloride content, it is possible to omit the initial evaporation and flow the brine directly into the solar heater. Sodium carbonate sulfate crystallizes as in the first instance but in a lesser amount. The yield can be increased by subsequently evaporating the brine and again exposing it in the solar heater.

I claim:

1. A process of heating brine comprising exposing to the action of the sun's rays brine beneath a sheet of material arranged to exclude the atmosphere and separated from the brine, said exposure being for a sufficient time to cause crystallization of a salt from said brine.

2. A process of heating brine comprising exposing to the action of the sun's rays brine separated from the atmosphere by a sheet of material separated from the brine by an intervening layer of air, said exposure being for a sufficient time to cause crystallization of a salt from said brine.

3. A process of heating brine comprising exposing the brine in a shallow pond to the action of the sun's rays, and excluding the atmosphere from said brine by a sheet of material separated from said brine, said exposure being for a sufficient time to cause crystallization of a salt from said brine.

4. A process of heating brine comprising exposing brine covered by a stationary layer of air to the action of the sun's rays, said exposure being for a sufficient time to cause crystallization of a salt from said brine.

5. A process of heating brine comprising flowing the brine beneath a glass plate which permits the passage of solar rays but excludes the atmosphere, said brine being disposed beneath said glass plate for a sufficient time to cause crystallization of a salt from said brine.

6. A process of heating brine comprising subjecting to the sun's rays brine in a pond covered with glass, said brine being so subjected for a sufficient time to cause crystallization of a salt from said brine.

In testimony whereof, I have hereunto set my hand.

GEORGE B. BURNHAM.